(12) United States Patent
Miller

(10) Patent No.: US 7,783,719 B2
(45) Date of Patent: Aug. 24, 2010

(54) METHOD OF AND SYSTEM FOR CREDITING AN ONLINE PUBLISHER IN AN AFFILIATE MARKETING RELATIONSHIP

(76) Inventor: Jonathan Bernadotte Miller, 101 Queensway, Irene Farm Villages, Irene Ext 49, Centurion 0157 (ZA)

( * ) Notice: Subject to any disclaimer, the term of this patent is extended or adjusted under 35 U.S.C. 154(b) by 374 days.

(21) Appl. No.: 11/797,611

(22) Filed: May 4, 2007

(65) Prior Publication Data

US 2007/0260736 A1 Nov. 8, 2007

(30) Foreign Application Priority Data

May 4, 2006 (ZA) .............................. 2006/03553

(51) Int. Cl.
G06F 17/60 (2006.01)
G06F 15/173 (2006.01)
G06Q 30/00 (2006.01)
(52) U.S. Cl. ..................... 709/217; 709/224; 709/238
(58) Field of Classification Search ......... 709/217–219, 709/224, 238; 705/14, 26
See application file for complete search history.

(56) References Cited

U.S. PATENT DOCUMENTS

| 2002/0029290 | A1* | 3/2002 | Burema et al. ............. 709/238 |
| 2003/0208442 | A1* | 11/2003 | Cockrill et al. ............. 705/40 |
| 2004/0103024 | A1* | 5/2004 | Patel et al. ................. 705/14 |
| 2005/0097204 | A1* | 5/2005 | Horowitz et al. ........... 709/223 |
| 2005/0273388 | A1* | 12/2005 | Roetter ....................... 705/14 |
| 2006/0212350 | A1* | 9/2006 | Ellis et al. ................... 705/14 |
| 2007/0244746 | A1* | 10/2007 | Issen et al. .................. 705/14 |

FOREIGN PATENT DOCUMENTS

| KR | 2002-0002848 A | 1/2002 |
| KR | 2002-0069515 A | 9/2002 |
| KR | 10-2006-0103035 A | 9/2006 |

* cited by examiner

Primary Examiner—Joseph E Avellino
Assistant Examiner—Thai N. Nguyen
(74) Attorney, Agent, or Firm—Birch, Stewart, Kolasch & Birch, LLP

(57) ABSTRACT

A method of crediting an online publisher when a user uses the online publisher to access an online advertiser using a web browser is disclosed. The online publisher displays a tracked advertisement on the user's browser, the tracked advertisement being identifiable by a publisher tracked advertisement identifier, with the online advertiser being associated with an advertising network that is hosted on an advertising network server. The online advertiser is identifiable by an advertising network identifier and an associated advertising network tracking integration code. The method comprises receiving a request from the user to access the advertising network server, directing the user to the advertising network server, setting a tracking cookie on the visitor's web browser, the tracking cookie including the publisher tracked advertisement identifier and a timestamp, redirecting the visitor's browser to a controlling server, setting a master cookie on the visitor's browser, the master cookie including the advertising network identifier and a timestamp on the user's browser, redirecting the visitor's browser to the online advertiser, allowing the user to conclude a transaction with the online advertiser, launching a confirmation page comprising a master pixel tracking integration code comprising at least one variable for the concluded transaction, sending the master pixel tracking integration code to the controlling server, checking the user's web browser for a previously set master cookie and, if the cookie is found, writing the transaction into the controlling server, crediting the advertising network specified in the cookie, and triggering the display of the advertising network tracking integration code.

11 Claims, 3 Drawing Sheets

METHOD OF AND SYSTEM FOR CREDITING AN ONLINE PUBLISHER IN AN AFFILIATE MARKETING RELATIONSHIP

BACKGROUND OF THE INVENTION

This invention relates to a method of and system for crediting an online publisher in an affiliate marketing relationship.

Online marketing is driven by performance measurement. The generally accepted practice is to use persistent cookies to track visitor referrals and sales behavior. A cookie, when used in respect of the Internet, refers to a small text file of information sent by a web server to a web browser that the browser software is expected to save and to send back to the server whenever the browser makes additional requests from the server. A cookie can only be retrieved and opened either by the web server that set it on the web browser, or locally by the owner of the machine that the web browser is hosted on.

In affiliate marketing, which is a common business methodology for driving visitors to advertising sites and which will be described in further detail below, cookies are leveraged to track the origin of the visitor with the intention of compensating the referring publisher/s for referring visitors to advertisers. In this regard, a cookie can contain information such as referring affiliate and network identifications, user identification, user preferences, archive shopping cart information, and other personally identifiable information.

A typical affiliate marketing relationship comprises the following three components:
1. The publisher, which is the affiliate site carrying the advertisers advertising.
2. The advertising network, which is the 3rd party tracking solution that serves the advertisements on the publisher's site/s, and tracks the performance of the advertisements.
3. The advertiser, which is the site on which the transaction is ultimately concluded.

The process flow in a typical affiliate marketing relationship will now be described with reference to FIG. 1. When a user/visitor visits a publisher website using his/her web browser, as indicated by action arrow 10, and clicks on a tracked advertisement served by the advertising network, the associated URL directs the visitors web browser to the advertising network's server, as indicated by action arrow 12. The advertising network's server sets a tracking cookie containing the publisher's tracked advertisement identification and a timestamp on the visitor's browser, as indicated by server request arrow 14. The advertising network's server then redirects the visitor's browser to the advertiser's website landing page, as indicated by redirect arrow 16.

After allowing the user/visitor to conclude the required action/s or transaction/s on the advertiser's site, the advertiser's website launches a confirmation page containing an advertising network pixel tracking integration code including variables for a transaction identification, an amount (if a sale took place), and other variables as determined necessary. This is indicated by action arrow 18.

The transaction is then reported to the advertising network's server, as indicated by server request arrow 20, with the pixel tracking integration code also being sent to the advertising network at this stage. The advertising network's server then checks the visitor's browser for a previously set advertising network cookie containing the publisher's tracked advertisement identification. If the cookie is found, the advertising network's pixel integration code writes the transaction, including the referring publisher's advertisement identification, transaction identification, the amount (if a sale took place) and other required variables into an advertising network database. This database is accessible by both the publisher and the advertiser so that each party can see the number of advertisements served, clicks, leads, sales or any other required actions generated.

In cases where multiple cookies from different publishers are found by the advertising network, the advertising network's business rules determine which publisher is allocated the sale, generally based on the timestamp in the cookie.

When running multiple advertisement network campaigns, the advertiser is expected to ensure that each advertising network's pixel integration code is embedded on the advertiser confirmation page to track each campaign. This, however, poses a number of problems, which will now be described:

Problem 1: Duplicate Transactions

Should a visitor web browser contain tracking cookies from multiple advertising networks and conclude a transaction, resulting in the confirmation page being displayed, it is highly likely that all the advertising networks' pixel tracking codes would be triggered and the advertising networks that found cookies showing referral information would write the transactions into their databases, as described. This would result in multiple networks showing the same transaction. To address this, a manual validation process by the advertiser to remove the duplicate transaction from the advertising networks would be required. However, in this regard, the advertiser would most likely not know the dates that the individual advertising networks' cookies were set on the visitor's web browser, and therefore would not be able to accurately determine which of the transactions to remove. This, in turn, would result in the advertiser erroneously removing transactions from deserving publishers.

One way of addressing this would be for the advertiser to set up individual confirmation pages for each of the advertising networks that it runs campaigns on. However, this option would require advanced customization to the advertiser's shopping cart, but most shopping cart software providers do not allow this practice.

Another way to address is to set up server side visitor tracking. This option, however, would further require setting up separate landing pages for each advertising network and the implementation of web server side visitor cookie tracking to ensure that if a transaction was not concluded and the visitor returned at a later date that the visitor's browser would be redirected back to the same landing page. In addition, this server side tracking would need to integrate into the shopping cart to ensure that only the referring advertising network's pixel was posted which would ensure the referring publisher was credited. Thus, this option requires advanced customization of the website and shopping cart, and is technically difficult, with the associated costs most likely tending to be prohibitive.

A further way to address this problem is to set up multiple shopping carts for each advertising network it runs campaigns on. However, again, this option would require customization and would also be expensive as it would require a software license for each shopping cart implemented. In addition, it would not address the issue of misappropriating sales, as returning visitors may not be directed back to the same shopping cart to conclude a transaction and as a result the transaction may not be recorded at all, or misappropriated to another channel or publisher.

Problem 2: Publisher Fraud

Should a visitor web browser contain tracking cookies from multiple advertising networks and conclude a transaction, resulting in the confirmation page being displayed, it is highly likely that all the advertising networks' pixel tracking codes would be triggered and the advertising networks that found cookies showing referral information would write the transactions into their databases, as described. Significantly, publishers that are members of multiple advertising networks could set multiple network cookies on a visiting web browser when an advertisement is triggered. This is done through a process called Cookie Stuffing or IFraming. An IFRAME is HTML code that inserts a floating frame within a Web page which is not bound to the side of a browser window. This IFRAME can be sized to 1 pixel high by 1 pixel wide and as a result would be invisible to the visitor viewing the web page using web browser software. Within the IFRAME the publisher could however trigger the launch of multiple advertising networks links, which would result in multiple advertising networks' cookies being set. Though the visitor would not be aware of this, the visitor's web browser would accept all these cookies and save them for future retrieval by the advertising networks.

As a result, should a visitor web browser contain tracking cookies from multiple advertising networks and conclude a transaction, resulting in the confirmation page being displayed, as described above, it is highly likely that all the advertising networks' pixel tracking codes would be triggered and the advertising networks that found cookies showing referral information would write the transactions into their databases. This would result in multiple networks showing the same transaction.

One way of addressing this would involve a manual validation process by the advertiser to remove the duplicate transactions from the advertising networks. However, the advertiser would most likely not know the dates that the individual advertising networks cookies were set on the visitor's website, and therefore would not be able to accurately determine which of the transactions to remove.

In addition, it would be difficult to prove whether a particular publisher was intentionally cookie stuffing, which would result in fraudulent affiliates with poor business practices remaining contracted to deliver transactions to the advertiser. Clearly, a side effect of this behavior is to undermine advertising outside the affiliate marketing channel.

Problem 3: Generating False Transactions

Should a publisher be able to identify the HTML link taxonomy used by the advertising networks, fraudulent publishers could take advantage of this by triggering the advertising networks pixel to generate false transactions by inserting fraudulent transaction identifications, amounts and other variables. This is generally done using advertising networks that do not offer domain validation to ensure that the advertising network integration pixel code is triggered only off the advertiser's valid domain.

Problem 4: Real Time Data Aggregation

Running multiple advertising network campaigns results in disparate sets of data that need to be manually reconciled and aggregated to ensure that reporting is synchronized. Each network has its own proprietary reporting interface and requires manual intervention to select and download reports. There is no interoperability standard or standard naming convention, and so centralizing and aggregating the data reported requires additional manual intervention to collate the data into spreadsheets or a data warehouse, from where reports across the multiple platforms can be generated. Significantly, these reports are not in real time, as the reports can only be generated intermittently and require manual intervention to check and remove duplicate sales prior to centralizing the reporting. Additionally not all platforms update their statistics and reporting in real time, resulting in skewed reports with data that does not match to the advertisers' transaction information.

Problem 5: Flawed Business Intelligence on Which to Base Decision Making

Resulting from the lack of real time data aggregation, advertisers are forced to make business critical decisions on incomplete transaction and management information. There is no way to independently benchmark performance across multiple advertising networks or campaigns and optimize performance in real time. This lack of information results in decisions being made based on historical or out of date business information that impacts the advertisers' ability to rapidly respond to fluid market conditions.

SUMMARY OF THE INVENTION

According to a first aspect of the invention there is provided a method of crediting an online publisher when a user uses the online publisher to access an online advertiser using a web browser, the online publisher displaying a tracked advertisement on the user's web browser, the tracked advertisement being identifiable by a publisher tracked advertisement identifier, the online advertiser being associated with an advertising network that is hosted on an advertising network server, with the online advertiser being identifiable by an advertising network identifier and an associated advertising network tracking integration code, the method comprising:

receiving a request from the user to access the advertising network server associated with the online advertiser;

directing the user to the advertising network server, either directly or through an intermediate relaying server;

setting a tracking cookie on the visitor's web browser, the tracking cookie including the publisher tracked advertisement identifier and a timestamp;

redirecting the visitor's web browser to a controlling server;

setting a master cookie on the visitor's web browser, the master cookie including the advertising network identifier and a timestamp on the user's web browser;

redirecting the visitor's web browser to the online advertiser;

allowing the user to conclude a transaction with the online advertiser;

launching a confirmation page comprising a master pixel tracking integration code, the master pixel tracking integration code comprising at least one variable for the concluded transaction;

sending the master pixel tracking integration code to the controlling server;

checking the user's web browser for a previously set master cookie; and if the cookie is found, writing the transaction into the controlling server, crediting the advertising network specified in the cookie, and triggering the display of the advertising network tracking integration code.

In an example embodiment, the master cookie that is set on the visitor's web browser may include the publisher's tracked advertisement identifier.

In an example embodiment, if the master cookie is found on the users web browser, the written transaction may include the at least one variable for the concluded transaction and the advertising network identifier.

In an example embodiment, the method includes writing the same transaction into a tracking system of the advertising network.

According to a second aspect of the invention there is provided a method of crediting an online publisher when a user uses the online publisher to access an online advertiser using a web browser, the online publisher displaying a tracked advertisement on the user's web browser, the tracked advertisement being identifiable by a publisher tracked advertisement identifier, the online advertiser being associated with an advertising network that is hosted on an advertising network server, with the online advertiser being identifiable by an advertising network identifier and an associated advertising network tracking integration code, with the online publisher receiving a request from the user to access the advertising network server associated with the online advertiser, with the user then being directed to the advertising network server, either directly or through an intermediate relaying server, so that the advertising network server can set a tracking cookie on the visitor's web browser, the tracking cookie including the publisher tracked advertisement identifier and a timestamp, with the advertising network server then redirecting the visitor's web browser to a controlling server, the method comprising:

setting a master cookie on the visitor's web browser, the master cookie including the advertising network identifier and a timestamp on the user's web browser;

redirecting the visitor's web browser to the online advertiser, so as to allow the user to conclude a transaction with the online advertiser, with the advertising network server launching a confirmation page comprising a master pixel tracking integration code, the master pixel tracking integration code comprising at least one variable for the concluded transaction, receiving the master pixel tracking integration code;

checking the user's web browser for a previously set master cookie;

if the cookie is found:
    writing the transaction into the controlling server;
    crediting the advertising network specified in the cookie; and
    triggering the display of the advertising network tracking integration code.

In an example embodiment, the master cookie that is set on the visitor's web browser may include the publisher's tracked advertisement identifier.

In an example embodiment, if the master cookie is found on the user's web browser, the written transaction may include the at least one variable for the concluded transaction and the advertising network identifier.

In an example embodiment, the method includes writing the same transaction into a tracking system of the advertising network.

According to a third aspect of the invention there is provided a system for crediting an online publisher when a user uses the online publisher to access an online advertiser using a web browser, the online publisher displaying a tracked advertisement on the user's web browser, the tracked advertisement being identifiable by a publisher tracked advertisement identifier, the online advertiser being associated with an advertising network that is hosted on an advertising network server, with the online advertiser being identifiable by an advertising network identifier and an associated advertising network tracking integration code, with the online publisher receiving a request from the user to access the advertising network server associated with the online advertiser, with the user then being directed to the advertising network server, either directly or through an intermediate relaying server, so that the advertising network server can set a tracking cookie on the visitor's web browser, the tracking cookie including the publisher tracked advertisement identifier and a timestamp, with the advertising network server then redirecting the visitor's web browser to a controlling server, the system comprising a processor to:

set a master cookie on the visitor's web browser, the master cookie including the advertising network identifier and a timestamp on the user's web browser;

redirect the visitor's web browser to the online advertiser, so as to allow the user to conclude a transaction with the online advertiser, with the advertising network server launching a confirmation page comprising a master pixel tracking integration code, the master pixel tracking integration code comprising at least one variable for the concluded transaction, receive the master pixel tracking integration code; and check the user's web browser for a previously set master cookie, wherein if the cookie is found, the processor is arranged to:
    write the transaction into the controlling server;
    credit the advertising network specified in the cookie; and
    trigger the display of the advertising network tracking integration code.

In an example embodiment, the master cookie that is set on the visitor's web browser may include the publisher's tracked advertisement identifier.

In an example embodiment, if the master cookie is found on the user's web browser, the written transaction may include the at least one variable for the concluded transaction and the advertising network identifier.

In an example embodiment, the processor is further arranged to write the same transaction into a tracking system of the advertising network.

According to a fourth aspect of the invention there is provided a system for crediting an online publisher when a user uses the online publisher to access an online advertiser using a web browser, the online publisher displaying a tracked advertisement on the user's web browser, the tracked advertisement being identifiable by a publisher tracked advertisement identifier, the online advertiser being associated with an advertising network that is hosted on an advertising network server, with the online advertiser being identifiable by an advertising network identifier and an associated advertising network tracking integration code, with the online publisher receiving a request from the user to access the advertising network server associated with the online advertiser, with the user then being directed to the advertising network server, either directly or through an intermediate relaying server, so that the advertising network server can set a tracking cookie on the visitor's web browser, the tracking cookie including the publisher tracked advertisement identifier and a timestamp, with the advertising network server then redirecting the visitor's web browser to a controlling server, the system comprising:

means for setting a master cookie on the visitor's web browser, the master cookie including the advertising network identifier and a timestamp on the user's web browser;

means for redirecting the visitor's web browser to the online advertiser, so as to allow the user to conclude a transaction with the online advertiser, with the advertising network server launching a confirmation page comprising a master pixel tracking integration code, the master pixel tracking integration code comprising at least one variable for the concluded transaction, means for receiving the master pixel tracking integration code; and means for checking the user's web browser for a previously set master cookie,
wherein if the cookie is found, the system further comprises:
   means for writing the transaction into the controlling server;
   means for crediting the advertising network specified in the cookie; and
   means for triggering the display of the advertising network tracking integration code.

In an example embodiment, the master cookie that is set on the visitor's web browser may include the publisher's tracked advertisement identifier.

In an example embodiment, if the master cookie is found on the user's web browser, the written transaction may include the at least one variable for the concluded transaction and the advertising network identifier.

In an example embodiment, the system further comprises means for writing the same transaction into a tracking system of the advertising network.

According to a fifth aspect of the invention there is provided a computer-readable medium embodying instructions for crediting an online publisher when a user uses the online publisher to access an online advertiser using a web browser, the online publisher displaying a tracked advertisement on the user's web browser, the tracked advertisement being identifiable by a publisher tracked advertisement identifier, the online advertiser being associated with an advertising network that is hosted on an advertising network server, with the online advertiser being identifiable by an advertising network identifier and an associated advertising network tracking integration code, with the online publisher receiving a request from the user to access the advertising network server associated with the online advertiser, with the user then being directed to the advertising network server, either directly or through an intermediate relaying server, so that the advertising network server can set a tracking cookie on the visitor's web browser, the tracking cookie including the publisher tracked advertisement identifier and a timestamp, with the advertising network server then redirecting the visitor's web browser to a controlling server, the instructions when executed by a machine cause the machine to:
   set a master cookie on the visitor's web browser, the master cookie including the advertising network identifier and a timestamp on the user's web browser;
   redirect the visitor's web browser to the online advertiser, so as to allow the user to conclude a transaction with the online advertiser, with the advertising network server launching a confirmation page comprising a master pixel tracking integration code, the master pixel tracking integration code comprising at least one variable for the concluded transaction,
   receive the master pixel tracking integration code; and
   check the user's web browser for a previously set master cookie, wherein if the cookie is found, the instructions further cause the machine to:
      write the transaction into the controlling server;
      credit the advertising network specified in the cookie; and
      trigger the display of the advertising network tracking integration code.

In an example embodiment, the master cookie that is set on the visitor's web browser may include the publisher's tracked advertisement identifier.

In an example embodiment, if the master cookie is found on the user's web browser, the written transaction may include the at least one variable for the concluded transaction and the advertising network identifier.

In an example embodiment, the processor is further arranged to write the same transaction into a tracking system of the advertising network.

DESCRIPTION OF A PREFERRED EMBODIMENT

Figure 1:
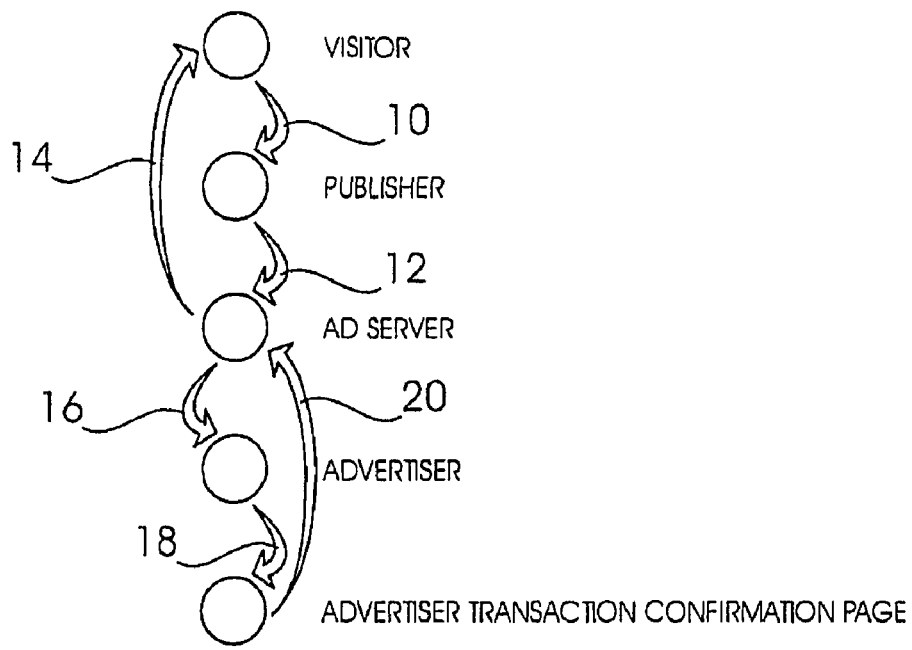
FIG. 1 shows a process flow in a typical affiliate marketing relationship.
Figure 2:
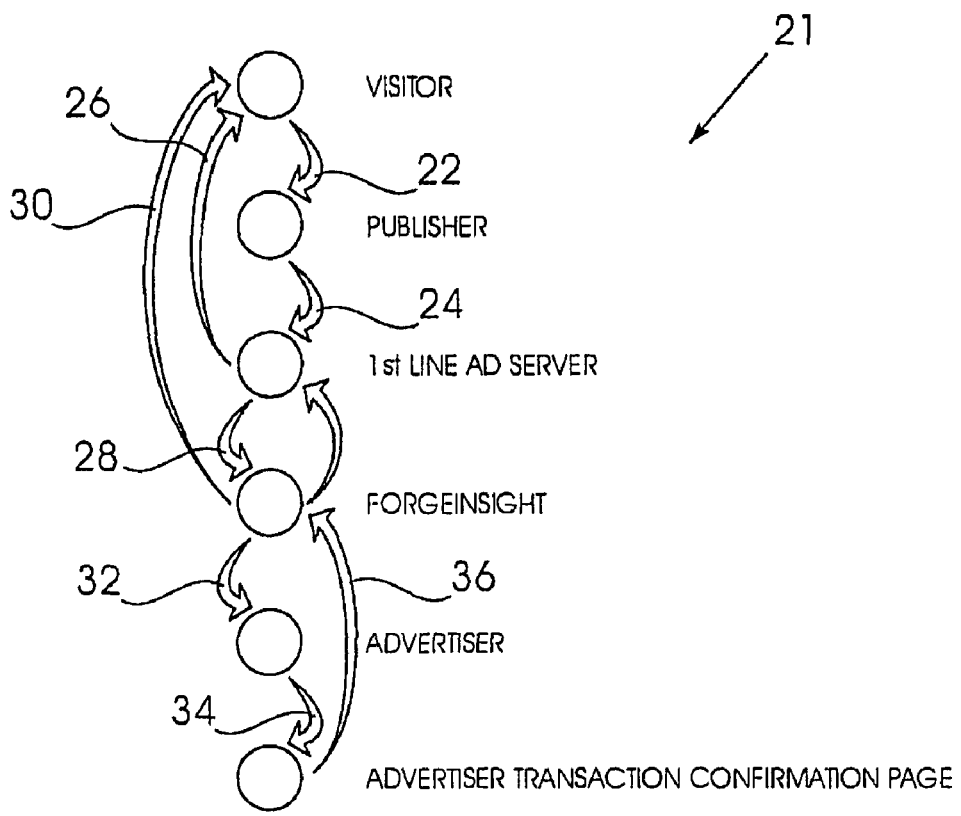
FIG. 2 shows a highly schematic process flow in an affiliate marketing relationship according to an example embodiment of the present invention.
Figure 3:
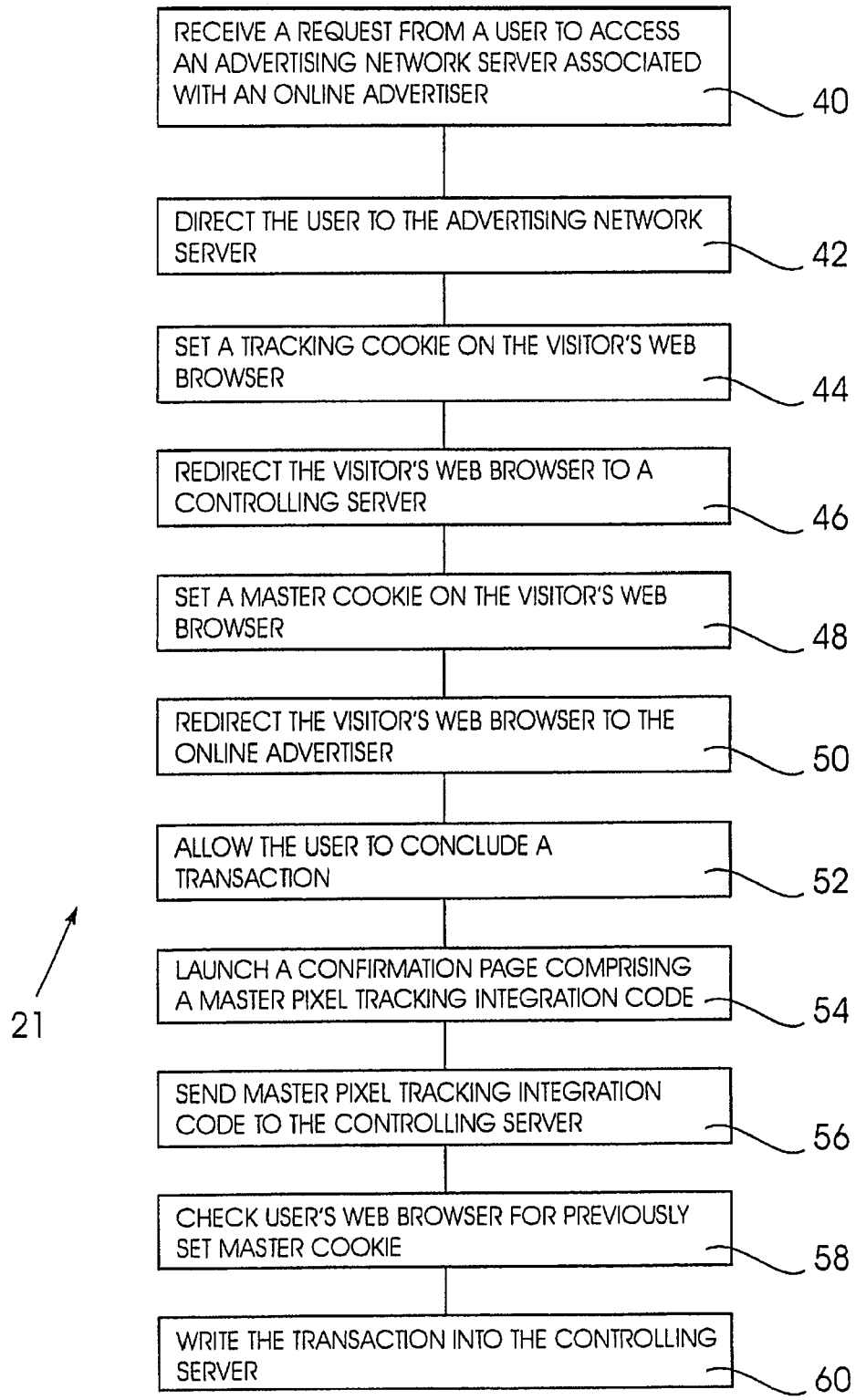
FIG. 3 shows a more detailed process flow of a method of crediting an online publisher, according to an example embodiment of the present invention.

Referring to FIGS. 2 and 3, a method 21 of crediting an online publisher when a user uses the online publisher to access an online advertiser using a web browser is shown. In an example embodiment, the online publisher displays a tracked advertisement on the user's web browser, with the tracked advertisement being identifiable by a publisher tracked advertisement identifier. The online advertiser may be associated with an advertising network that is hosted on an advertising network server, with the online advertiser being identifiable by an advertising network identifier and an associated advertising network tracking integration code.

The method 21 comprises the online publisher receiving a request from the user to access the advertising network server associated with the online advertiser, as indicated by block 40 in FIG. 3. This may be done by the user clicking on a tracked advertisement on the publisher's web site served by the advertising network, as shown by arrow 22 in FIG. 2.

The online publisher then directs the user to the advertising network server, as shown by arrow 24 in FIG. 2 and block 42 in FIG. 3. This may be done either directly or through an intermediate relaying server.

The advertising network server sets a tracking cookie on the visitor's web browser, as shown by arrow 26 in FIG. 2 and block 44 in FIG. 3, with the tracking cookie including the publisher tracked advertisement identifier and a timestamp.

The advertising network server then redirects the visitor's web browser to a controlling server, as shown by arrow 28 in FIG. 2 and block 46 in FIG. 3. The controlling server is referred to as ForgeInsight in FIG. 2.

The controlling server sets a master cookie on the visitor's web browser, the master cookie including the advertising network identifier and a timestamp on the user's web browser. This is shown by arrow 30 in FIG. 2 and block 48 in FIG. 3. The master cookie may further include the publisher's tracked advertisement identifier.

The controlling server redirects the visitor's web browser to the online advertiser, and in particular to the advertiser's website landing page, as shown by arrow 32 in FIG. 2 and block 50 in FIG. 3.

The user is then able to conclude a transaction or action with the online advertiser, typically on the advertisers website itself, in a conventional manner. This is indicated by block 52 in FIG. 3.

Once the transaction has been concluded, the advertising network server launches a confirmation page, shown by arrow 34 in FIG. 2 and block 54 in FIG. 3, the confirmation page comprising a master pixel tracking integration code. The master pixel tracking integration code comprises at least one variable/transaction data for the concluded transaction, the variables including, but not limited to, transaction identification and the amount of the transaction (if a sale took place).

The advertising network server then sends the master pixel tracking integration code to the controlling server, as shown by arrow 36 in FIG. 2 and block 56 in FIG. 3, which instructs the controlling server to check the user's web browser for a previously set master cookie, as indicated by block 58 in FIG. 3.

If the cookie is found, the controlling server writes the transaction into a data warehouse of the controlling server, as indicated by block 60 in FIG. 3. The transaction may include the at least one variable for the concluded transaction and the advertising network identifier. The controlling server further credits the advertising network specified in the cookie, and triggers the display of the advertising network tracking integration code. Preferably, the advertising network tracking integration code is an advertising network pixel tracking integration code.

Preferably, the method 21 includes the controlling server writing the same transaction into a tracking system of the advertising network.

The present invention thus ensures that the correct advertising network and the correct publisher would receive credit for the transaction as per the business rules set up in the controlling server.

Figure 4:
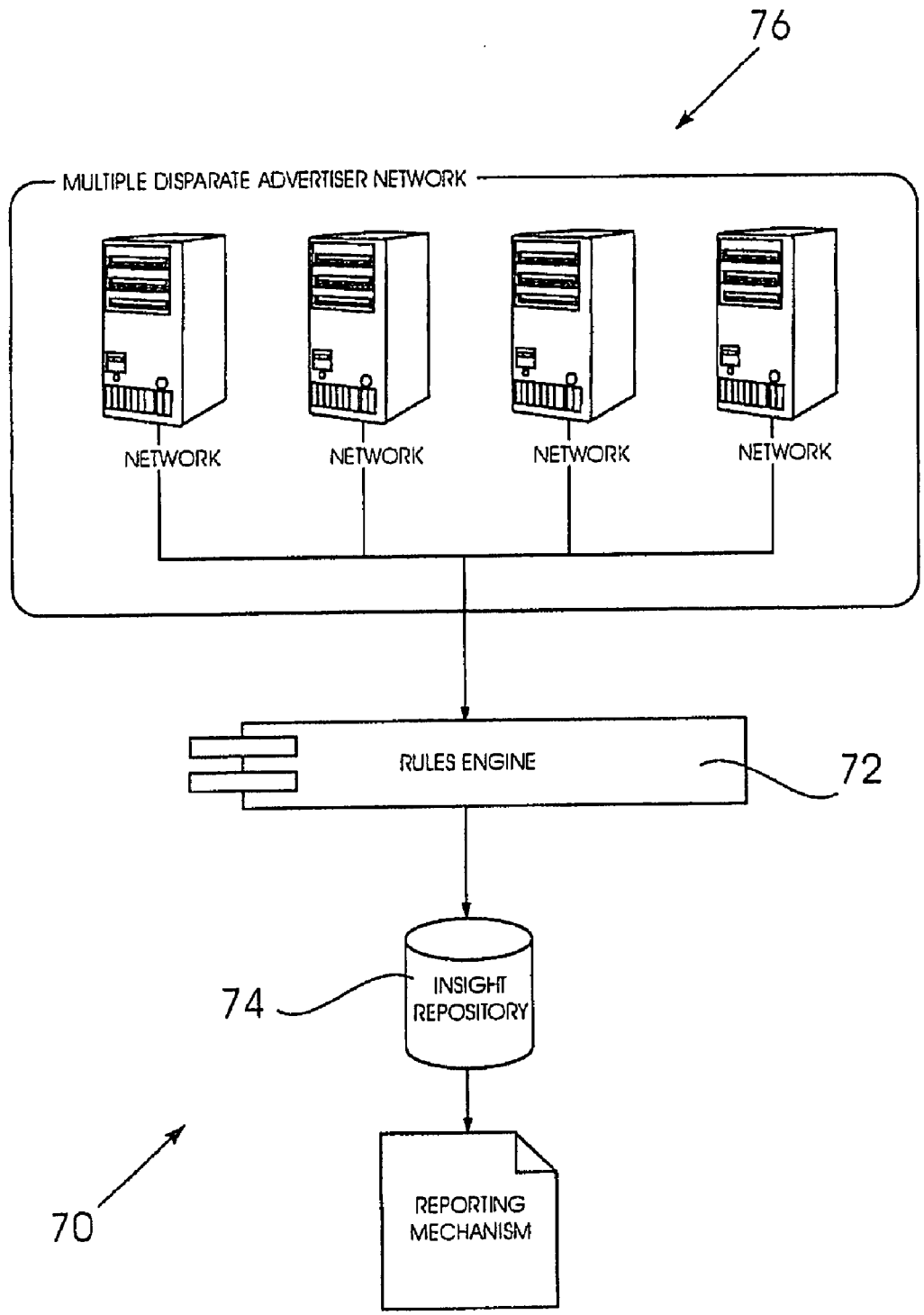
FIG. 4 shows a highly schematic block diagram of a system that may be used to execute the process flow shown in FIGS. 2 and 3, according to an example embodiment.

Turning now to FIG. 4, a highly schematic block diagram of a system 70 that may be used to execute the process flow 21 shown in FIGS. 2 and 3 will now be described. The controlling server described above is indicated by reference numeral 72 directed towards a Rules Engine, and serves to aggregate into a Business Intelligence Repository database 74 Multiple Disparate Advertiser Networks 76 using the method 21 described above. The Rules Engine/controlling server 72 may be arranged to regularly update the database 74 with the latest, real time data for transactions for publishers and affiliates. This information may then be made available through a members portal for statistical and decision making information reporting.

In particular, the present invention addresses the problems described above as follows:

Solution to Problem 1: Duplicate Transactions

Since the controlling server determines which advertising network originated the transaction based on the variables contained in the master cookie and only triggers the display of the associated advertising network pixel tracking integration code, the transaction can only be recorded into the controlling server and the advertising network to which it was assigned, thereby addressing the duplicate transaction problem.

Solution to Problem 2: Publisher Fraud

Since the controlling server determines which advertising network originated the transaction based on the variables contained in the master cookie and only triggers the display of the associated advertising network pixel tracking integration code, the transaction can only be recorded into the controlling server and advertising network to which it was assigned. This would result in the publisher only being credited for the transaction in one network, even if the publisher held multiple accounts across various advertising networks. As a result, publishers would be paid only for one valid referred transaction, but would not be able to claim duplicate referral fees.

Solution to Problem 3: Generating False Transactions

The current invention requires that the master pixel tracking integration code be sent by the correct advertising network. Thus, should this code be copied from the advertising network's confirmation page it will not be able to trigger sales, as it would not have been sent by the correct advertiser network.

Solution to Problem 4: Real Time Data Aggregation

The controlling server first writes all the transaction information into its data warehouse and then triggers the display of the advertising network pixel tracking integration code to post the transaction data into the advertising network responsible for generating the transaction. This real-time synchronization results in the data always being up to date for all tracked advertising networks and campaigns. In other words, transaction data is synchronized at point of capture rather than at point of individual advertising network processing, and thus does not need to be retrieved manually or in a batch process.

Solution to Problem 5: Flawed Business Intelligence on Which to Base Decision Making Since the data is synchronized at point of capture into the controlling server, it will better correspond with the advertising network's in-house metrics and give a far better overview of the real-time status of the publisher's performance. The data warehouse provides far more accurate information having eliminated duplicate sales and intra-network reporting delays, which are significant contributors to skewed reporting.

The invention claimed is:

1. A method of crediting an online publisher when a user uses the online publisher to access an online advertiser using a web browser, the online publisher displaying a tracked advertisement on the user's web browser, the tracked advertisement being identifiable by a publisher tracked advertisement identifier, the online advertiser being associated with an advertising network that is hosted on an advertising network server, with the online advertiser being identifiable by an advertising network identifier and an associated advertising network tracking integration code, the method comprising:

receiving a request from the user to access the advertising network server associated with the online advertiser;

directing the user to the advertising network server, either directly or through an intermediate relaying server;

setting a tracking cookie on the user's web browser, the tracking cookie including the publisher tracked advertisement identifier and a timestamp;

redirecting the user's web browser to a controlling server;

setting a master cookie on the user's web browser, the master cookie including the advertising network identifier and a timestamp on the user's web browser;

redirecting the user's web browser to the online advertiser;

allowing the user to conclude a transaction with the online advertiser;

launching a confirmation page comprising a master pixel tracking integration code, the master pixel tracking integration code comprising at least one variable for the concluded transaction;

sending the master pixel tracking integration code to the controlling server;

checking the user's web browser for a previously set master cookie;

and if the master cookie is found, writing the transaction into the controlling server, crediting the advertising network specified in the master cookie, and triggering the display of the advertising network tracking integration code;
wherein the master cookie is separate from the tracking cookie;
and wherein the master cookie that is set on the user's web browser includes the publisher's tracked advertisement identifier.

2. The method of claim 1, wherein if the master cookie is found on the user's web browser, the written transaction includes the at least one variable for the concluded transaction and the advertising network identifier.

3. The method of claim 1, which includes writing the same transaction into a tracking system of the advertising network.

4. A method of crediting an online publisher when a user uses the online publisher to access an online advertiser using a web browser, the online publisher displaying a tracked advertisement on the user's web browser, the tracked advertisement being identifiable by a publisher tracked advertisement identifier, the online advertiser being associated with an advertising network that is hosted on an advertising network server, with the online advertiser being identifiable by an advertising network identifier and an associated advertising network tracking integration code, with the online publisher receiving a request from the user to access the advertising network server associated with the online advertiser, with the user then being directed to the advertising network server, either directly or through an intermediate relaying server, so that the advertising network server can set a tracking cookie on the user's web browser, the tracking cookie including the punisher tracked advertisement identifier and a timestamp, with the advertising network server then redirecting the user's web browser to a controlling server, the method comprising:
receiving a request from the user to access the advertising network server associated with the online advertiser;
directing the user to the advertising network server, either directly or through an intermediate relaying server;
setting a tracking cookie on the user's web browser, the tracking cookie including the publisher tracked advertisement identifier and a timestamp;
redirecting the user's web browser to a controlling server;
setting a master cookie on the user's web browser, the master cookie including the advertising network identifier and a timestamp on the user's web browser;
redirecting the user's web browser to the online advertiser, so as to allow the user to conclude a transaction with the online advertiser, with the advertising network server launching a confirmation page comprising a master pixel tracking integration code, the master pixel tracking integration code comprising at least one variable for the concluded transaction,
receiving the master pixel tracking integration code;
checking the user's web browser for a previously set master cookie;
if the master cookie is found:
writing the transaction into the controlling server;
crediting the advertising network specified in the master cookie; and triggering the display of the advertising network tracking integration code.
wherein the master cookie is separate from the tracking cookie;
and wherein the master cookie that is set on the user's web browser includes the publisher's tracked advertisement identifier.

5. The method of claim 4, wherein if the master cookie is found on the user's web browser, the written transaction includes the at least one variable for the concluded transaction and the advertising network identifier.

6. The method of claim 5, which includes writing the same transaction into a tracking system of the advertising network.

7. A system for crediting an online publisher when a user uses the online publisher to access an online advertiser using a web browser, the online publisher displaying a tracked advertisement on the user's web browser, the tracked advertisement being identifiable by a publisher tracked advertisement identifier, the online advertiser being associated with an advertising network that is hosted on an advertising network server, with the online advertiser being identifiable by an advertising network identifier and an associated advertising network tracking integration code, with the online publisher receiving a request from the user to access the advertising network server associated with the online advertiser, with the user then being directed to the advertising network server, either directly or through an intermediate relaying server, so that the advertising network server can set a tracking cookie on the user's web browser, the tracking cookie including the publisher tracked advertisement identifier and a timestamp, with the advertising network server then redirecting the user's web browser to a controlling server, the system comprising a processor to:
receiving a request from the user to access the advertising network server associated with the online advertiser;
directing the user to the advertising network server, either directly or through an intermediate relaying server;
setting a tracking cookie on the user's web browser, the tracking cookie including the publisher tracked advertisement identifier and a timestamp;
redirecting the user's web browser to a controlling server;
set a master cookie on the user's web browser, the master cookie including the advertising network identifier and a timestamp on the user's web browser;
redirect the user's web browser to the online advertiser, so as to allow the user to conclude a transaction with the online advertiser, with the advertising network server launching a confirmation page comprising a master pixel tracking integration code, the master pixel tracking integration code comprising at least one variable for the concluded transaction,
receive the master pixel tracking integration code;
and check the user's web browser for a previously set master cookie,
wherein if the master cookie is found, the processor is arranged to:
write the transaction into the controlling server;
credit the advertising network specified in the master cookie;
and trigger the display of the advertising network tracking integration code;
wherein the master cookie is separate from the tracking cookie;
and wherein the master cookie that is set on the user's web browser includes the publisher's tracked advertisement identifier.

8. The method of claim 7, wherein if the master cookie is found on the user's web browser, the written transaction includes the at least one variable for the concluded transaction and the advertising network identifier.

9. The method of claim 7, wherein the processor is further arranged to write the same transaction into a tracking system of the advertising network.

10. A system for crediting an online publisher when a user uses the online publisher to access an online advertiser using a web browser, the online publisher displaying a tracked advertisement on the user's web browser, the tracked advertisement being identifiable by a publisher tracked advertisement identifier, the online advertiser being associated with an advertising network that is hosted on an advertising network server, with the online advertiser being identifiable by an advertising network identifier and an associated advertising network tracking integration code, with the online publisher receiving a request from the user to access the advertising network server associated with the online advertiser, with the user then being directed to the advertising network server, either directly or through an intermediate relaying server, so that the advertising network server can set a tracking cookie on the user's web browser, the tracking cookie including the publisher tracked advertisement identifier and a timestamp, with the advertising network server then redirecting the user's web browser to a controlling server, the system comprising:

means for receiving a request from the user to access the advertising network server associated with the online advertiser;

means for directing the user to the advertising network server, either directly or through an intermediate relaying server;

means for setting a tracking cookie on the user's web browser, the tracking cookie including the publisher tracked advertisement identifier and a timestamp;

means for redirecting the user's web browser to a controlling server;

means for setting a master cookie on the user's web browser, the master cookie including the advertising network identifier and a timestamp on the user's web browser;

means for redirecting the user's web browser to the online advertiser, so as to allow the user to conclude a transaction with the online advertiser, with the advertising network server launching a confirmation page comprising a master pixel tracking integration code, the master pixel tracking integration code comprising at least one variable for the concluded transaction, means for receiving the master pixel tracking integration code;

and means for checking the user's web browser for a previously set master cookie, wherein if the master cookie is found, the system further comprises:

means for writing the transaction into the controlling server;

means for crediting the advertising network specified in the master cookie;

and means for triggering the display of the advertising network tracking integration code.

wherein the master cookie is separate from the tracking cookie;

and wherein the master cookie that is set on the user's web browser includes the publisher's tracked advertisement identifier.

11. A non-transitory computer-readable medium embodying instructions for crediting an online publisher when a user uses the online publisher to access an online advertiser using a web browser, the online publisher displaying a tracked advertisement on the user's web browser, the tracked advertisement being identifiable by a publisher tracked advertisement identifier, the online advertiser being associated with an advertising network that is hosted on an advertising network server, with the online advertiser being identifiable by an advertising network identifier and an associated advertising network tracking integration code, with the online publisher receiving a request from the user to access the advertising network server associated with the online advertiser, with the user then being directed to the advertising network server, either directly or through an intermediate relaying server, so that the advertising network server can set a tracking cookie on the user's web browser, the tracking cookie including the publisher tracked advertisement identifier and a timestamp, with the advertising network server then redirecting the user's web browser to a controlling server, the instructions when executed by a machine cause the machine to:

receive a request from the user to access the advertising network server associated with the online advertiser;

direct the user to the advertising network server, either directly or through an intermediate relaying server;

set a tracking cookie on the user's web browser, the tracking cookie including the publisher tracked advertisement identifier and a timestamp;

redirect the user's web browser to a controlling server;

set a master cookie on the user's web browser, the master cookie including the advertising network identifier and a timestamp on the user's web browser;

redirect the user's web browser to the online advertiser, so as to allow the user to conclude a transaction with the online advertiser, with the advertising network server launching a confirmation page comprising a master pixel tracking integration code, the master pixel tracking integration code comprising at least one variable for the concluded transaction, receive the master pixel tracking integration code; and check the user's web browser for a previously set master cookie, wherein if the master cookie is found, the instructions further cause the machine to:

write the transaction into the controlling server;

credit the advertising network specified in the master cookie;

and trigger the display of the advertising network tracking integration code wherein the master cookie is separate from the tracking cookie;

and wherein the master cookie that is set on the user's web browser includes the publisher's tracked advertisement identifier.

\* \* \* \* \*